United States Patent [19]

Lehr et al.

[11] Patent Number: 5,330,161
[45] Date of Patent: Jul. 19, 1994

[54] SPRAY COOLED HOOD SYSTEM FOR HANDLING HOT GASES FROM A METALLURGICAL VESSEL UTILIZING PNEUMATIC PROCESSING OF MOLTEN METAL

[75] Inventors: David A. Lehr, Medina; Gordon R. Roberts, North Olmsted; Mark T. Arthur, Lakewood, all of Ohio

[73] Assignee: Ucar Carbon Technology Corporation, Danbury, Conn.

[21] Appl. No.: 88,800

[22] Filed: Jul. 8, 1993

[51] Int. Cl.[5] .............................................. C21C 5/38
[52] U.S. Cl. .................................................. 266/158
[58] Field of Search ........................................ 266/158

[56] References Cited

U.S. PATENT DOCUMENTS

| | | | |
|---|---|---|---|
| 3,169,160 | 2/1965 | Johansson | 266/158 |
| 3,482,827 | 12/1969 | Maide | 266/158 |
| 4,715,042 | 12/1987 | Heggart et al. | 373/74 |
| 4,815,096 | 3/1989 | Burwell | 373/74 |
| 4,849,987 | 7/1989 | Miner, Jr. et al. | 373/74 |

Primary Examiner—Melvyn J. Andrews
Attorney, Agent, or Firm—F. J. McCarthy

[57] ABSTRACT

Hood assembly for pneumatic process metallurgical vessel, such as BOF, which includes removeable spray cooled sub-assemblies at predetermined locations in the hood assembly.

4 Claims, 3 Drawing Sheets

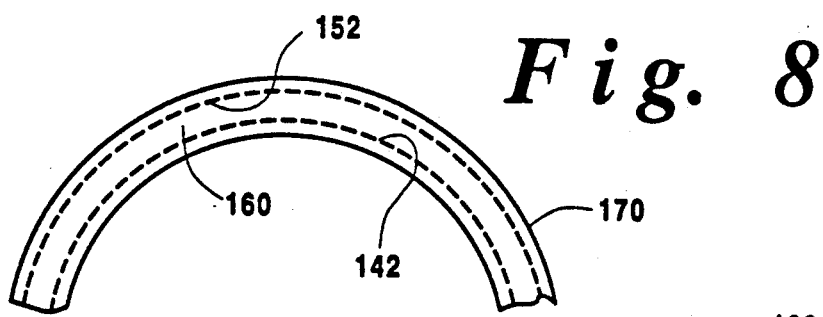
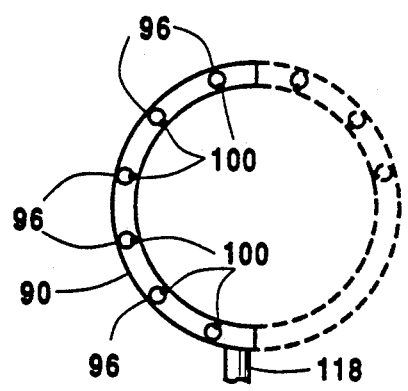
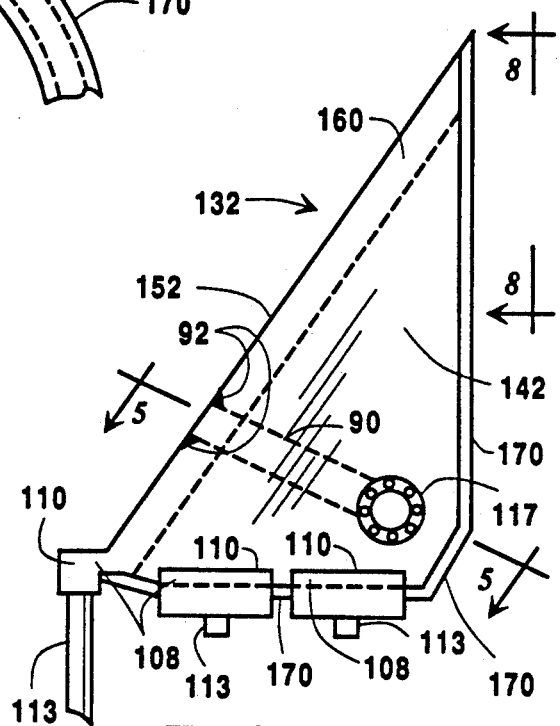
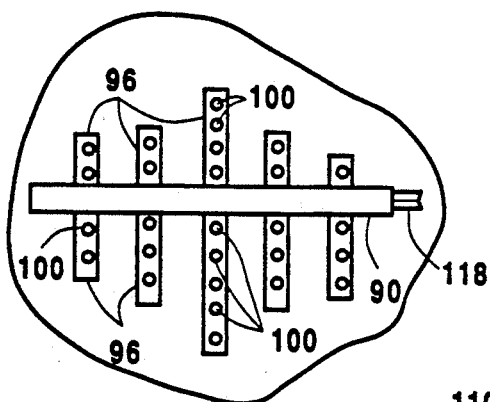
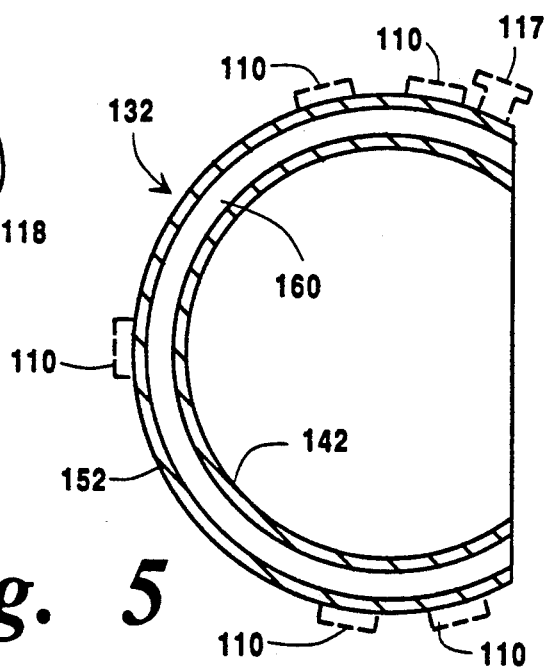

SPRAY COOLED HOOD SYSTEM FOR HANDLING HOT GASES FROM A METALLURGICAL VESSEL UTILIZING PNEUMATIC PROCESSING OF MOLTEN METAL

FIELD OF THE INVENTION

The invention relates to spray cooled sub-assemblies of a hood system for metallurgical vessels utilizing pneumatic processing of molten metal, e.g. the oxygen treatment of molten iron in the course of making steel.

BACKGROUND OF THE INVENTION

With the various types of pneumatic processing metallurgical vessels, for example BOF vessels, it is necessary to capture the hot exhaust gases generated during operation and to conduct these gases to exhaust devices remote from the vessel generating the hot gases. A common technique for capturing and conducting the exhaust gases is a hood system arrangement formed of hollow metal members which are joined together with one end of the system being open and overlying the portion of the metallurgical vessel from which hot gases are exiting. The hood system commonly comprises vertical, oblique and horizontal portions in order to conform to space restrictions and consequently the exposure to hot exhaust gases varies from location to location in the hood system. Hood systems are currently cooled in order to avoid failure due to exposure to hot exhaust gases typically through the use of water cooled elements, e.g. plates, in which water is continuously circulated through a circuit of closed conduits. The achievement of effective and efficient cooling is complicated due to the wide variety of temperature conditions in different portions of the hood system and the extent and irregular configuration of hood systems and the use of cooling arrangements which apply the same cooling system to different portions of the hood assembly results in serious inefficiencies. It is also known to spray cool roofs and sidewalls of metallurgical vessels using substantially uniformly arranged spray nozzles which overlay the entire roof or sidewall and being supplied with coolant from a common source.

SUMMARY OF THE INVENTION

The present invention is directed to a hollow hood assembly for handling hot gases from a metallurgical vessel, having a plurality of removeable sub-assemblies. Each sub-assembly comprises an inner metal base member shaped to form a pre-determined portion of the periphery of a hollow section and an outer metal covering member spaced from the base member. Means are provided for joining the outer covering member to the inner base member and for defining a substantially enclosed space between the spaced apart base member and the covering member except for one or more liquid drain openings located at the lowermost portion of the enclosed space. A plurality of spray means are located within the enclosed space at predetermined locations adjacent to and spaced from the metal base member for directing a spray of liquid coolant, e.g. water in the form of droplets against the surface of the metal base member in an amount sufficient to maintain a temperature in the metal base member appropriate to its location in the hood assembly, i.e. the amount of coolant applied to the surface of the metal base member is independently controlled to address the particular thermal conditions to which the base member is exposed to maintain a satisfactorily low temperature therein. A liquid supply header conduit, with communicating spray bars, is affixed within the enclosed space and extends across the metal base member for supplying liquid to the spray means which include nozzles selected to provide a spray of coolant appropriate to the thermal stress at the metal base member. A liquid supply conduit is provided for supplying liquid directly and independently from a liquid supply source which is located outside of the enclosed space to the liquid supply header conduit positioned within said enclosed space and at least one liquid drain receptacle located adjacently outside of the space and in communication with one or more drain openings for receiving a flow of liquid from inside of said enclosed space. A liquid drain conduit is provided for directly and independently withdrawing liquid from the drain receptacles to substantially avoid any buildup of liquid within said enclosed space. Means are also provided for removeably closely engaging a sub-assembly to the hood assembly.

BRIEF DESCRIPTION OF THE DRAWINGS

FIG. 4 is a side elevation view of a sub-assembly of the present invention shown in FIG. 1;

FIG. 5 is a cross-section of the sub-assembly of FIG. 4;

FIG. 6 shows a section of the header and spray means of the sub-assembly of FIG. 5;

FIG. 7 shows a partial section of the header and spray means of FIG. 6; and

FIG. 8 is a partial section of the sub-assembly of FIG. 4.

DETAILED DESCRIPTION OF THE INVENTION

Figure 1:
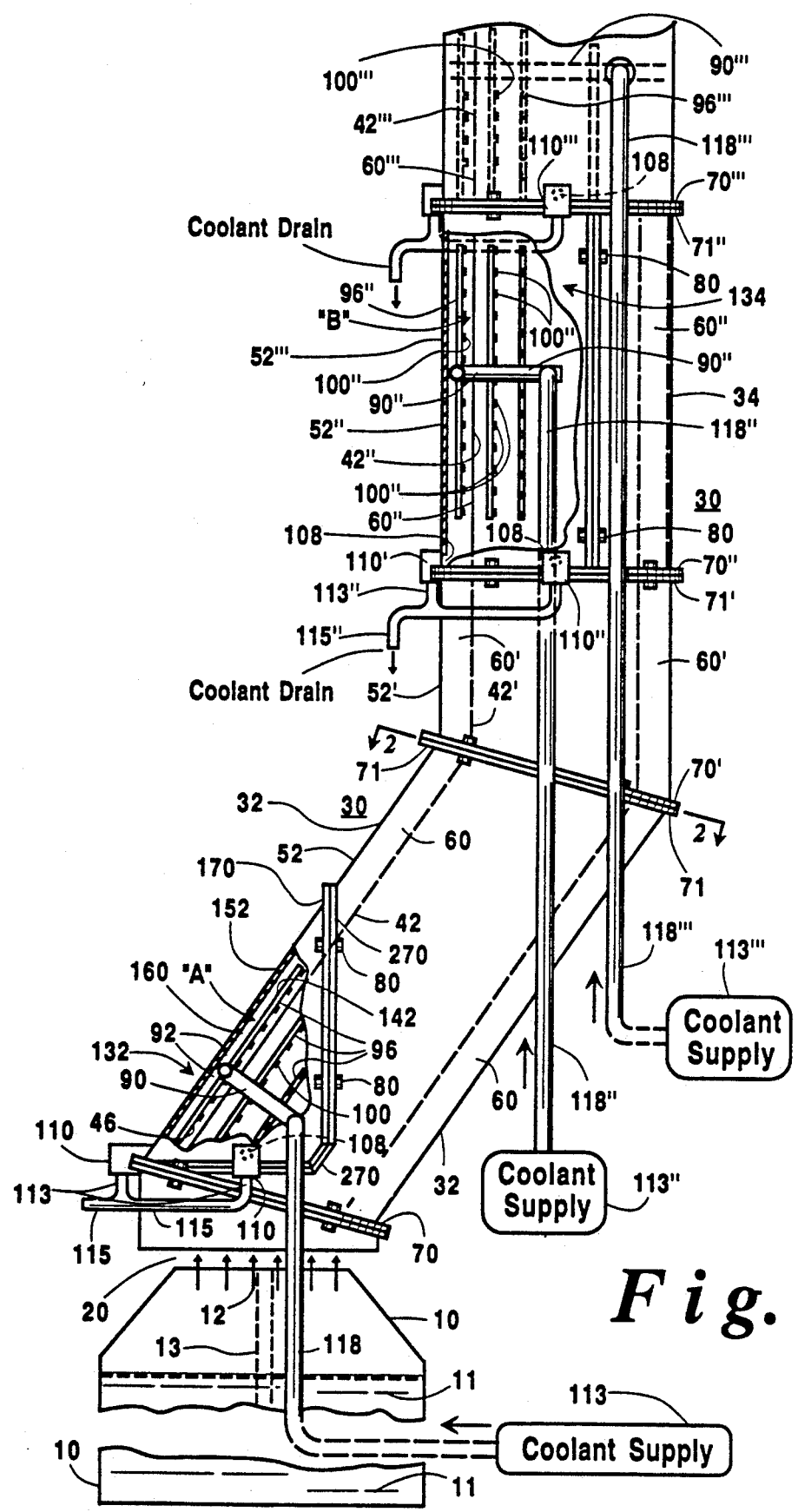
FIG. 1 is an elevation view partly in section showing a portion of a hood assembly which includes sub-assemblies in accordance with the present invention.
Figure 2:
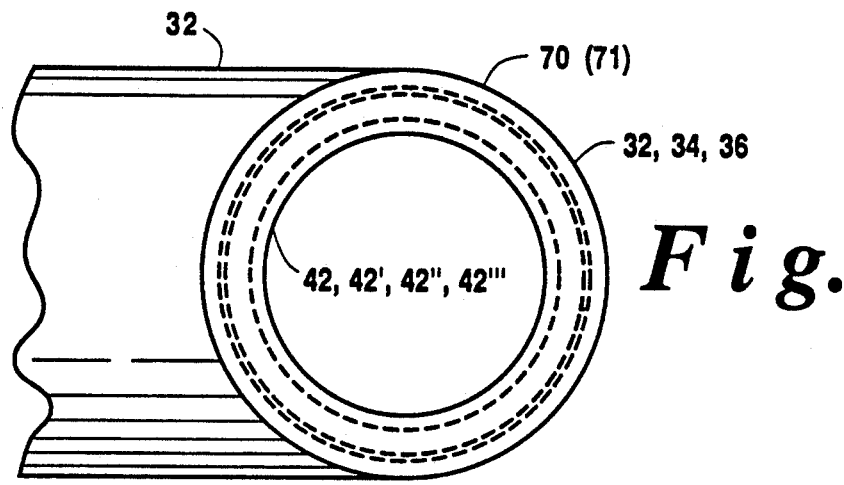
FIG. 2 is a plan view applicable to the respect sections of the hood assembly of FIG. 1.
Figure 3A:
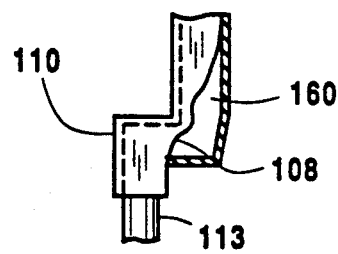
FIGS. 3A, 3B, 3C are partial views of portions of a sub-assembly shown in FIG. 1.
Figure 3C:
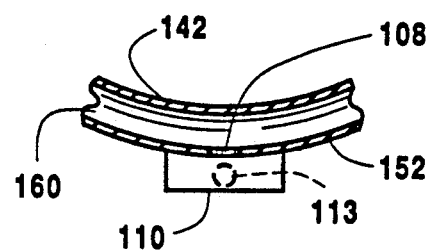
Figure 3B:
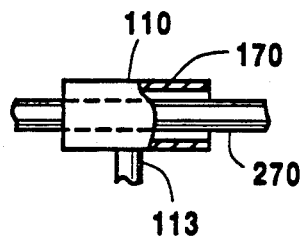

With reference to FIG. 1, a pneumatic process metallurgical vessel, for example a conventional BOF vessel is indicated at 10 containing molten metal, e.g. iron 11 in which oxygen lance 13 is immersed and from which hot gases 20 enter hood system 30 and pass through a plurality of hollow steel sections 32, 34, 36...until exhausted from the hood system by conventional exhaust devices. The respective hollow sections can be positioned oblique as shown for section 32, vertical as shown for sections 34, 36 and can also be horizontal and curved to accommodate space requirements. As a result of the non-symmetrical hood configuration, the various hood sections experience widely different thermal environments, and different portions of the respective hood sections experience different thermal conditions. For example, hollow hood section 32 is closest to and directly overlies the gas exhaust opening 12 of BOF vessel 10 and is exposed to radiant heat emanating from within vessel 10 as well as a strong, direct blast of hot gases from vessel 10. Thus, the thermal environment interior of the oblique section 32 is different from that of downstream section 34 which is exposed only to heat from hot exhaust gases which have previously passed through section 32. Likewise, the thermal conditions at region "A" of section 32, directly above the outlet 12 of vessel 10 are more severe than elsewhere in section 32. Also, for purposes of example, thermal conditions at an exemplary region "B" of section 34 might be expected to be more severe than the thermal conditions elsewhere in section 34. The thermal conditions, i.e. temperatures, at the various portions of the inner surfaces 42, . . . 42''' hollow sections can be measured routinely or calculated and the most severe thermal regions determined, e.g. regions "A", "B". It is these regions that will most require cooling and the extent of required cooling is different for the respective regions. As shown in FIGS. 1 and 2, inner surface 42 of hollow section 32 and outer surface 52 form a space 60 therebetween which is substantially enclosed by flanges 70, 71 in combination with inner surface 42 and outer surface 52. Spray cooling only for region "A" of section 32 is enabled by providing removeable sub-assembly 132 shown in FIG. 1 suitably closely engaged with section 132, e.g. by fasteners 80, such as a nut and bolt arrangement. The sub-assembly 132 has an inner curvilinear metal base member 142 conforming to the shape of the periphery of hollow section 32 and an outer conformal curvilinear metal covering member 152 in register therewith, and a space 160 therebetween which is enclosed by end flange 170. The end flange 170 is coupled by fasteners 80 to flange 270 of section 32 to form the integral hood section 32. A liquid coolant supply header conduit 90 is positioned within space 160 and extends across the metal base member 142 and is curvilinear to conform to the surface of base member 142 as shown in FIG. 6 and is in a plane perpendicular to the surface of base member 142. Header conduit 90 is fixed within space 160 by being welded to outer surface 152 of sub-assembly 132 as indicated at 92. Liquid coolant, e.g. water is delivered under pressure to header conduit 90 through inlet 117 by coolant line 118 which independently services only header conduit 90 of sub-assembly 132 from coolant supply 113, i.e. header conduit 90 is not serially connected with any other header conduit or spray means. A plurality of hollow spray bars 96 extend axially outwardly transverse from header conduit 90 within region "A" to deliver coolant, e.g. water to spray nozzles 100 which are components of spray bars 96 and are selected to deliver liquid droplets to the surface of inner metal base member 142 at a rate which cools base member 142 in region "A" to a desired lower temperature, with the coolant remaining in liquid form and exiting space 160 through apertures 108 to drain receptacles 110 which communicate with space 160 and are positioned at the lowermost portion thereof. The liquid in receptacles 110 is withdrawn through outlets 113 drain line 115 which drains only space 160 of sub-assembly 132. A similar removeable independently spray cooled and drained sub-assembly 134 can be provided for hood section 34 to spray cool region "B" as shown in FIG. 1. Likewise, removeable independently spray cooled and drained sub-assemblies can be provided for any section of a hood assembly.

A particular advantage of the present invention is the ability to provide appropriate cooling at particular locations of a hood assembly independently of any other cooling arrangements provided in the hood system. For example, the hood system may be cooled by a conventional cooling with the present invention being employed at those regions where temperature conditions are excessively high. This means that the cooling can be customized at these regions independently of the remainder of the cooling system resulting in increased coolant management efficiency and reduced equipment costs since a lower cost cooling system can be used in the portions of the hood which do not experience high thermal stress.

What is claimed is:

1. A hollow hood assembly comprising a plurality of hollow hood sections for handling hot gases from a pneumatic processing metallurgical vessel, said hollow hood assembly having a plurality of removeable sub-assemblies, a said removeable sub-assembly comprising:
   a) an inner metal base member shaped to form a predetermined portion of the periphery of a hollow hood section;
   b) an outer metal covering member spaced from and in register with said inner metal base member;
   c) means for joining the outer covering member to the inner metal base member and for defining a substantially enclosed space between said spaced apart base member and said covering member with one or more outer liquid drain openings being located at the lowermost portion of the enclosed space;
   d) a plurality of spray means located within said enclosed space at predetermined locations adjacent to and spaced from said inner metal base member for directing a spray of liquid coolant in the form of liquid droplets against the inner metal base member in an amount sufficient to maintain an acceptable temperature in said inner metal base member;
   e) a liquid coolant supply header conduit affixed within said enclosed space and extending across the inner metal base member for supplying liquid coolant to said spray means;
   f) a liquid coolant supply conduit for supplying liquid directly and independently to said sub-assembly from a liquid coolant supply source which is located outside of said enclosed space to said liquid coolant supply header conduit within said enclosed space;
   g) at least one liquid coolant drain receptacle located adjacently outside of said enclosed space and in communication with said one or more drain openings for receiving a flow of liquid coolant from inside of said enclosed space;
   h) a liquid coolant drain conduit for directly and independently withdrawing liquid coolant from said drain receptacles of said sub-assembly and substantially avoiding any buildup of liquid coolant within said enclosed space; and
   i) means for removeably closely engaging a said sub-assembly to a said hollow hood section.

2. Hood assembly in accordance with claim 1 wherein said plurality of spray means are hollow tubes extending transverse to said liquid coolant supply header conduit which incorporate a plurality of spray nozzles.

3. Hood assembly in accordance with claim 1 wherein said substantially enclosed spaced is completely closed except for said liquid drain openings.

4. Hood assembly in accordance with claim 1 wherein said liquid coolant supply header conduit is not serially connected with any other header conduit or spray means.

* * * * *